US010523520B2

(12) United States Patent
Aggarwal et al.

(10) Patent No.: US 10,523,520 B2
(45) Date of Patent: Dec. 31, 2019

(54) SYSTEM ANOMALY DETECTION USING PARAMETER FLOWS

(71) Applicant: International Business Machines Corporation, Armonk, NY (US)

(72) Inventors: Pooja Aggarwal, Bangalore (IN); Shubham Atreja, Bangalore (IN); Gargi Banerjee Dasgupta, Bangalore (IN); Atri Mandal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 15/608,022

(22) Filed: May 30, 2017

(65) Prior Publication Data

US 2018/0351817 A1   Dec. 6, 2018

(51) Int. Cl.
| | |
|---|---|
| *G06F 15/173* | (2006.01) |
| *H04L 12/24* | (2006.01) |
| *H04L 29/06* | (2006.01) |
| *G06F 21/55* | (2013.01) |

(52) U.S. Cl.
CPC .......... *H04L 41/142* (2013.01); *G06F 21/552* (2013.01); *H04L 41/069* (2013.01); *H04L 63/1425* (2013.01); *H04L 63/1408* (2013.01); *H04L 63/1433* (2013.01)

(58) Field of Classification Search
CPC ............... H04L 41/142; H04L 63/1425; H04L 63/1408; H04L 63/1433; H04L 12/24; H04L 29/06; G06F 21/50; G06F 21/552
See application file for complete search history.

(56) References Cited

U.S. PATENT DOCUMENTS

| | | | |
|---|---|---|---|
| 8,495,429 B2 | 7/2013 | Fu et al. | |
| 9,009,091 B2 | 4/2015 | Pawar et al. | |
| 9,298,525 B2* | 3/2016 | Zhu | ..................... G06F 11/0709 |
| 2008/0172409 A1 | 7/2008 | Botros et al. | |

(Continued)

OTHER PUBLICATIONS

Animesh Nandi et al., "Anomaly Detection Using Program Control Flow Graph Mining from Execution Logs", KDD 16, Aug. 13-17, 2016, San Francisco, CA, USA, 10 pages, ACM Digital Library.

*Primary Examiner* — Cheikh T Ndiaye
(74) *Attorney, Agent, or Firm* — Ference & Associates LLC

(57) ABSTRACT

One embodiment provides a method, including: receiving a plurality of loglines from a system execution log; generating at least one control flow graph by mining (i) a plurality of templates and (ii) a sequence of the plurality of templates defined by an order encountered during execution from the system execution log, wherein the control flow graph identifies flows between templates during execution; mining (i) discriminative parameters, (ii) a position for each of the mined discriminative parameters within a template, and (iii) a value of each of the mined discriminative parameters; annotating edges of the at least one control flow graph with the values of the mined discriminative parameters within the control flow graph; identifying execution traces from the system execution log using the values of the mined discriminative parameters; and detecting system anomalies in the identified execution traces by comparing one of the execution traces to an expected execution.

20 Claims, 3 Drawing Sheets

(56) References Cited

U.S. PATENT DOCUMENTS

| | | | |
|---|---|---|---|
| 2013/0046786 A1* | 2/2013 | Fabbri | G16H 10/60 707/776 |
| 2015/0106324 A1* | 4/2015 | Puri | G06N 5/04 706/52 |
| 2015/0143522 A1 | 5/2015 | Baum et al. | |
| 2015/0242431 A1 | 8/2015 | Vlcek | |
| 2016/0371489 A1* | 12/2016 | Puri | G06F 21/554 |
| 2017/0068709 A1 | 3/2017 | Dasgupta et al. | |
| 2017/0300532 A1* | 10/2017 | Simhon | G06F 17/2705 |

* cited by examiner

SYSTEM ANOMALY DETECTION USING PARAMETER FLOWS

BACKGROUND

Systems generate logs that record events occurring in the system. In other words when an activity takes place (e.g., a user accesses the system, the system performs a function, etc.), a message is recorded in the system log. The system logs are generally in the form of loglines that are a manifestation of some print statement. The message or logline(s) may include information that records transactions within the system (e.g., changes in the stored data, etc.), notifications (e.g., failure to execute a command, successful completion of a function, etc.), events initiated by a user (e.g., user log-in, a user manipulation of information within the system, etc.), and the like. The loglines are generally formatted in an interleaved fashion. In other words, as events happen, the events are recorded in the system log in a linear timeline, without any regard to a contextual relationship between that event and other recorded events in the system log. System logs can be useful for detecting errors or anomalies within the system. For example, the system logs can be mined to determine if the system is operating and functioning as expected. Even without a specific error in the system, the system logs may indicate that a function is not performing as expected, and that a problem has occurred or may occur.

BRIEF SUMMARY

In summary, one aspect of the invention provides a method, comprising: utilizing at least one processor to execute computer code that performs the steps of: receiving a plurality of loglines from a system execution log; generating at least one control flow graph of the system execution log by mining (i) a plurality of templates from the system execution log and (ii) a sequence of the plurality of templates defined by an order encountered during execution from the system execution log, wherein the control flow graph identifies flows between templates during execution; mining, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that identify flow from one template to another template within the control flow graph; annotating edges of the at least one control flow graph with the values of the mined discriminative parameters within the control flow graph; identifying execution traces from the system execution log using the values of the mined discriminative parameters; and detecting system anomalies in the identified execution traces by comparing one of the execution traces to an expected execution identified using the annotated at least one control flow graph.

Another aspect of the invention provides an apparatus, comprising: at least one processor; and a computer readable storage medium having computer readable program code embodied therewith and executable by the at least one processor, the computer readable program code comprising: computer readable program code that receives a plurality of loglines from a system execution log; computer readable program code that generates at least one control flow graph of the system execution log by mining (i) a plurality of templates from the system execution log and (ii) a sequence of the plurality of templates defined by an order encountered during execution from the system execution log, wherein the control flow graph identifies flows between templates during execution; computer readable program code that mines, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that identify flow from one template to another template within the control flow graph; computer readable program code that annotates edges of the at least one control flow graph with the values of the mined discriminative parameters within the control flow graph; computer readable program code that identifies execution traces from the system execution log using the values of the mined discriminative parameters; and computer readable program code that detects system anomalies in the identified execution traces comparing one of the execution traces to an expected execution identified using the annotated at least one control flow graph.

An additional aspect of the invention provides a computer program product, comprising: a computer readable storage medium having computer readable program code embodied therewith, the computer readable program code executable by a processor and comprising: computer readable program code that receives a plurality of loglines from a system execution log; computer readable program code that generates at least one control flow graph of the system execution log by mining (i) a plurality of templates from the system execution log and (ii) a sequence of the plurality of templates defined by an order encountered during execution from the system execution log, wherein the control flow graph identifies flows between templates during execution; computer readable program code that mines, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that identify flow from one template to another template within the control flow graph; computer readable program code that annotates edges of the at least one control flow graph with the values of the mined discriminative parameters within the control flow graph; computer readable program code that identifies execution traces from the system execution log using the values of the mined discriminative parameters; and computer readable program code that detects system anomalies in the identified execution traces comparing one of the execution traces to an expected execution identified using the annotated at least one control flow graph.

A further aspect of the invention provides a method, comprising: utilizing at least one processor to execute computer code that performs the steps of: receiving at least one control flow graph associated with an execution log, wherein the control flow graph comprises a plurality of templates and a plurality of edges, wherein each of the plurality of edges identifies a flow from one of the templates to another of the templates; identifying, from the execution log, a plurality of discriminative parameters, wherein a discriminative parameter comprises a parameter that distinguishes between one of the edges from one of the templates to a second of the templates and another of the edges from the one of the templates to a third of the templates; for each of the plurality of discriminative parameters, identifying a value of the discriminative parameter and a position of the discriminative parameter with respect to an edge of the control flow graph; annotating, with the values of the discriminative parameter, the edge of the control flow graph corresponding to the position of the discriminative parameter; and identifying system anomalies in the execution log by comparing a system execution flow to an expected system execution flow identified using the annotated control flow graph.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
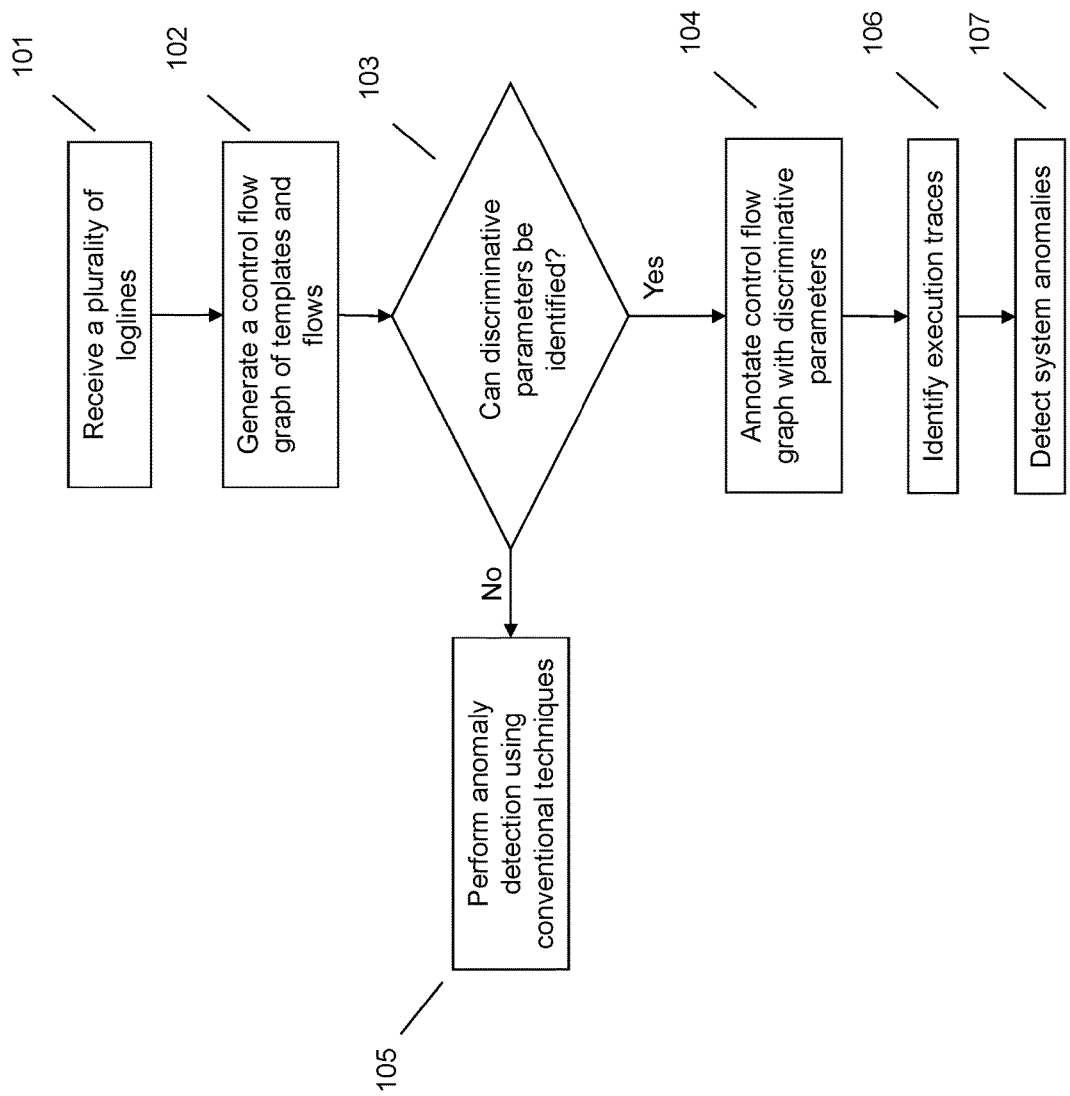
FIG. 1 illustrates a method of detecting system anomalies using control flow graphs annotated with discriminative parameters

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Using system logs to identify or detect errors or anomalies is very common. System logs are generally formatted similarly across many different systems using a series of logs lines that are manifestations of some print statement identifying an event occurring within the system. Each log line or print statement has a template format which identifies locations of invariants and parameters within the print statement. The invariants remain unchanged across similar print statements. Parameters, on the other hand, change and are specific to the print statement. For example, a logline may include parameters identifying the user identification, internet protocol (IP) address, and system generating the print statement. However, the general format of the print statement remains unchanged with the invariants of the template print statement.

When attempting to detect system anomalies, system logs may be a good source for detection of the anomalies or errors. An anomaly may include a function or event that is unexpected or a function or event that is expected by does not match the expected system pattern even if no system error has occurred as a result of the anomaly. An error may include a malfunction of the system. For ease of readability, the term anomaly will be used herein throughout. However, it should be understood, that the systems and methods described herein not only apply to anomalies, but also apply to errors. Current systems detect templates from the log lines and use the templates to detect the anomalies. The templates are mined from the loglines and any parameters are replaced by a placeholder. In conventional systems the parameters are not captured due to the large volume of parameters and the fact that the parameters are changing from one template to another. Therefore, it is very difficult to store the parameters and even if stored it is difficult to glean any information from the parameters because they are ever changing. However, parameters may include information that may be very useful in identifying or detecting system anomalies.

Accordingly, an embodiment provides a method of mining discriminative parameters from system logs and using these discriminative parameters to assist in detecting system anomalies. The system may receive a plurality of loglines from a system log and generate a control flow graph from the system log. The control flow graph may be generated in two steps. The first step involves mining a plurality of templates from the system logs. In the second step, template sequences are mined by mining temporally co-occurring templates and computing nearest-neighbor search (NNS) groups for each template and then projecting the logstream on a per NNS group basis to efficiently mine template sequences in the presence of interleaved log traces or log sequences. While determining temporally co-occurring templates, the context in which the templates occur is also considered. The context is decided by the values corresponding to the mined discriminative parameter positions within the templates. The control flow graph may be generated by mining a plurality of templates from the system logs and identifying the flow from one template to another template during system execution. The control flow graph may be similar to a tree structure where the flow from one template may be to two or more templates (e.g., a branch in the control flow graph).

The system may mine or identify discriminative parameters from the system logs. Discriminative parameters include parameters which provide an indication of the flow from one template to another. In other words, if, from the parameter, it can be distinguished which template would be selected at a branch, the parameter may be considered a discriminative parameter. Mining discriminative parameters can be accomplished using a variety of techniques as described in more detail below. When mining the discriminative parameters, the system may also determine the position of the discriminative parameter with respect to edges of the control flow graph. In other words, the system may determine which branch or edge in the control flow graph corresponds to the discriminative parameter. The system may also identify the value of the mined discriminative parameter.

Once the discriminative parameters are identified and mined, the system may annotate the control flow graph with these parameters. Annotating the control flow graph may include annotating the edge of the control flow graph corresponding to the discriminative parameter with the value of the parameter. The annotated control flow graphs may then be used by the system to identify execution traces from the system logs. An execution trace may include individual threads that belong to a particular system, user, or may have some other connection. Once the execution traces have been identified, the system may use the annotated control flow graphs to assist in detecting system anomalies.

Such a system provides a technical improvement over current systems for detecting system anomalies. Using the systems and methods as described herein, logline parameters, which may include useful information related to system anomalies, may be mined to assist in the identification of the anomaly. Due to the large number of parameters, the system narrows the volume of parameters that need to be stored by identifying discriminative parameters, or parameters which may provide some useful information related to the system flow. The discriminative parameters, positions, and values may be used to annotate a control flow graph which can be used to identify execution traces and detect system anomalies. Therefore, as opposed to current anomaly detection systems, the systems and methods as described herein provide a more accurate and effective way of detecting system anomalies that is not possible with conventional systems which ignore or discard all parameters.

Referring now to FIG. 1, the system may collect, obtain, or otherwise receive a plurality of loglines from one or more system execution logs at 101. The system execution log(s) may include records of transactions (e.g., changes in the stored data, accessing data, accessing a software platform, etc.), notifications (e.g., failure to execute a command, successful execution of a command, etc.), and the like. The log files may comprise a plurality of log messages which represent events or activities within a system. The activity may include activity corresponding to either system activity or end-user activity.

At 102, the system may generate one or more control flow graphs of the system logs by mining a plurality of templates from the system log. The templates may correspond to different loglines that reoccur throughout the system log and represent an event type. For example, a user log-in event may generate a logline that corresponds to a log-in template. Event types may correspond to different activities occurring within the system. Example event types may include login, logout, accessing another system, executing a command, manipulating data within a system, and the like. To generate the message templates, the collected log files may be run through a clustering algorithm that finds messages that have the same or similar activity pattern. A basic message template may then be constructed for each cluster of messages. For example, very common user actions such as logging onto a server or connecting to a website may produce thousands of messages which may detail each action taken by both the user and the system. A clustering algorithm consolidates these numerous types of detailed messages and collapses them into a simplistic template message. Since the loglines are collapsed into a template, the template also provides information regarding the location of parameters within the logline. Specifically, since the parameters are replaced by a placeholder within the template, the system can determine where parameters occur within the loglines.

The control flow graph also identifies the sequence of the templates within the execution log. In other words, the control flow graph provides information regarding the potential flow from one template to another template. For example, the control flow graph may be constructed similar to a tree structure. When the flow from one template can go to two or more templates, the control flow graph branches, showing the potential flow from the first template to the second or the third template. The term path as used in conjunction with the control flow graph indicates that the control flow graph can be traversed to get from the source template to the destination template. In other words, if the control flow graph cannot be traversed via the edges within the control flow graph to get from the starting template to the destination template, a path does not exist between that starting template to that destination template.

At 103 the system may determine whether discriminative parameters can be identified within the execution logs. Discriminative parameters include those parameters which assist in distinguishing between two or more templates within the control flow graph. Thus, the discriminative parameters comprise parameters from the plurality of loglines that identify the flow from one template to another template within the control flow graph. In other words, if at a branch in the control flow graph, a parameter does not give an indication of which edge to traverse, the parameter is not considered discriminative. On the other hand, if the parameter provides an indication that one edge or subsequent template will be accessed based upon the value of the parameter, then the parameter is considered discriminative.

Figure 2:
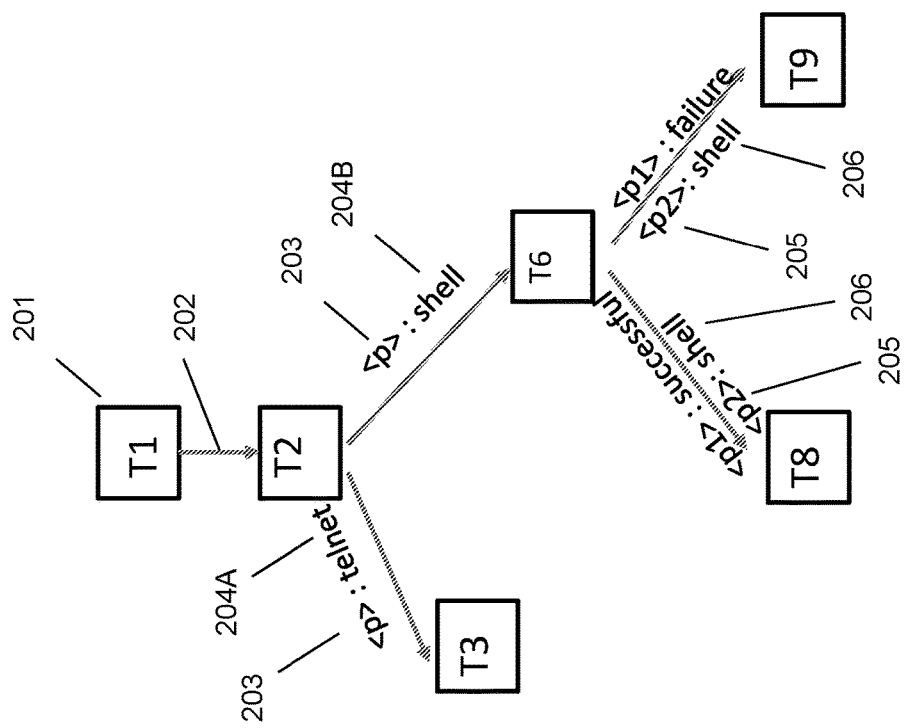
FIG. 2 illustrates an example of a control flow graph including parameters.

FIG. 2 provides a simplistic example control flow graph which includes parameters and parameter values at branches in the control flow graph. It should be understood that in practice control flow graphs are much more complicated and contain many more nodes, edges, and parameters. For example, a node may have more than two children nodes. As another example, more than one parameter may flow from one template to another template. The graph includes nodes corresponding to different templates 201. The control flow graph also includes edges 202 indicating a flow from one template to another. As can be seen, the flow after T2 can go to either T3 or T6. Thus, the flow from T2 branches. Similarly, the flow from T6 branches to either T8 or T9. The edges from the branch at T2 include a parameter <p> 203. The parameter also includes parameter values 204A and 204B. As can be seen at this branch, the parameter values for parameter <p> 203 are different depending on whether the flow from T2 goes to T3 or T6. Specifically, the parameter value to T3 is "telnet", while the parameter value to T6 is "shell". Thus, the value of parameter <p> 203 provides an indication of the flow from T2, specifically, whether the flow goes to T3 or T6. Accordingly, parameter <p> 203 may be considered a discriminative parameter. In other words, at template T2, the value of parameter <p> 203 is important for determining which edge of the branch will be selected.

On the other hand, parameter <p2> 205 on the branches from T6 is a non-discriminative parameter. This is because the parameter value "shell" 206 is passed to both T8 and T9. Thus, even knowing the parameter value 206 of parameter <p2> 205 does not provide an indication of which template is selected after T6. In other words parameter <p2> 205 does not provide an indication of the flow from T6 to a subsequent template. Accordingly, parameter <p2> 205 is a non-discriminative parameter and can be discarded. In other words, at template T6 parameter <p2> 205 is not important because the parameter value 206 is passed to both children of parent template T6.

In mining or identifying the discriminative parameters, the system may use a variety of techniques to determine whether the parameter is discriminative. If or while determining if a parameter is discriminative, the system may identify the position of the discriminative parameter with respect to the edge of the control flow graph. In other words, the system may determine which edge in the control flow graph the parameter identifies and provide an indication of the flow from one template to another template. The system may also identify the value associated with the parameter. For example, referring to FIG. 2, the value of parameter <p> 203 from T2 to T3 is "telnet" 204A, wherein the value of parameter <p> 203 from T2 to T6 is "shell" 204B.

One method for mining or identifying discriminative parameters is using a frequency distribution of the parameter values. The system may take all the parameter values and identify a frequency of occurrence within the control flow graph for each parameter value. The frequency distribution of all the parameter values may be identified. Any parameter values that occur at a frequency less than a predetermined threshold may be filtered or discarded. In other words, if a parameter value only occurs a few times in the control flow graph, the parameter value may not provide enough information to determine a flow from one template to another template. The threshold frequency which determines whether a parameter will be discarded may be a default setting or set by a user. For example, a user may select that parameter values occurring at less than 5% may be discarded.

Another method for mining or identifying discriminative parameters includes a parameter to template indexing technique. The system may index all the templates which contain a particular parameter value. The system may then identify possible flows through the control flow graph from the indexed templates. If a path through the control flow graph cannot be identified using a parameter value, the system may discard or filter that parameter. For example, using the control flow graph of FIG. 2 and ignoring the parameters, assume that a parameter (p1) is included at T1, T2, and T6, and a parameter (p2) is included at T3 and T8. The system can identify a path from T1 to T2 and then T6. Thus, parameter (p1) may be useful. However, there is no path from T3 to T8. In other words, parameter (p2) occurs randomly across different templates. Thus, parameter (p2) is not useful.

Another method for mining or identifying discriminative parameters includes a hypothesis testing technique. The system may hypothesize that if a parameter is discriminative then there must be a frequency distribution of the parameter values that corresponds to the branching factor. In other words, the frequency that one parameter value occurs may correspond to the frequency that a particular edge is chosen from two or more edges within a branch. To identify this correlation, the system may determine the probability that an edge will be selected and assign this probability to this edge. The system may then determine how frequently a parameter associated with the edge occurs. If the probability of the edge and the frequency of the parameter are correlated, the system may determine the parameter is discriminative. If there is no correlation between the edge probability and the parameter frequency, the system may discard the parameter. As an example, if the frequency of a parameter occurring is 40%, the system may identify if the edge probability is similar. If the edge probability is similar, the system may determine there is a correlation between the parameter and the edge.

Another technique for identifying a discriminative parameter is a discriminate parameter technique. Using this technique the system determines if the observed values for the parameter flow to all the children of the template. For example, referring to FIG. 2, the parameter <p2> 205 has the same value "shell" 206 whether it flows from T6 to T8 or from T6 to T9. In other words, the parameter value 206 of parameter <p2> 205 flows to all the children of T6. Therefore, the parameter <p2> 205 is not discriminate because it does not assist in distinguishing which flow or edge will be taken in the control flow graph.

Another technique for identifying a discriminative parameter is using a machine learning approach. The system may extract the parameter values from an instance of the template in the control flow graph. During sequence mining, the system may use information regarding time bins and nodes that occurred during the different time bins. The system may use this information and map the parameter values from the instance to the corresponding target node that occurred during in the time bin. A labeled dataset for the template may be generated and used as training data. The training data may be used to run supervised learning algorithms to extract discriminative parameter positions and build a classifier at each branching location. Given an instance of the template, the classifier can predict which child template will be a target node based upon the parameter values in that instance.

As can be understood, other methods for identifying discriminative parameters are contemplated and can be used. Additionally, the techniques as described herein may be used alone or in combination with one or more of the described techniques. For example, the system may use both the discriminate parameter technique and the parameter to template indexing technique. As another example, the system may use all the described techniques. In the case that the techniques result in conflicting information, different techniques may be weighted or considered more accurate. Thus, parameters identified as discriminative using those techniques may be considered discriminative even if, using a different technique, the parameter is identified as non-discriminative. Alternatively, the techniques may be used in a hierarchical fashion. In other words, one technique may be performed and the next technique is performed only on the parameters that were not filtered by the preceding technique.

If no parameters can be identified as discriminative at 103, the system may perform anomaly detection using conventional techniques, for example, using the mined templates and control flow graph as discussed above. If, however, the system can identify at least one parameter as discriminative at 103, the system may perform anomaly detection using the discriminative parameters at 104, 106, and 107. At 104, the system may annotate edges of the control flow graph with the value of the mined discriminative parameters that correspond to the position of the edge. Using the example of FIG. 2, the edge from T2 to T3 would be annotated with the parameter <p> 203 and parameter value "telnet" 204A. Similar annotation of discriminative parameters would occur throughout the control flow graph.

Using the values of the mined discriminative parameters, the system may identify execution traces at 106. Identifying an execution trace may include separating individual threads form the system execution logs. For example, the execution traces may include identifying loglines that correspond to other loglines, for example, by system, user, and the like. Accordingly, the system may identify which loglines correspond to a single flow through the control flow graph, for example, for a single user.

The system may then, at 107, detect system anomalies in the execution traces using the annotated control flow graph (s). Conventional techniques result in both false positives and false negatives. Using the annotated control flow graph, the systems and methods as described herein may reduce the number of false positives and false negatives. The system as described herein uses the discriminative parameters to identify the context of the execution trace. Using this context, the system can identify whether the execution trace identifies a system anomaly. For example, the system may identify if a parameter is included in an execution trace that is not based on a possible path within the control flow graph. As an example, if the execution trace identifies that a parameter is sent from one template to another where that parameter is not a possible parameter for that edge, the system may identify this trace as an anomaly.

As another example, conventional systems may identify infrequent parameters as anomalous. For example, conventional systems may identify edges that occur infrequently as noise. Accordingly, when the edge occurs in the system log, the conventional system may identify it as an anomaly, even though the edge may be a valid path within the control flow graph, thereby resulting in a false negative. Using the parameters and parameter values as in the system described herein, the system can identify the parameter and the parameter value as valid parameters and parameter values for the edge and mark the system as healthy.

Figure 3:
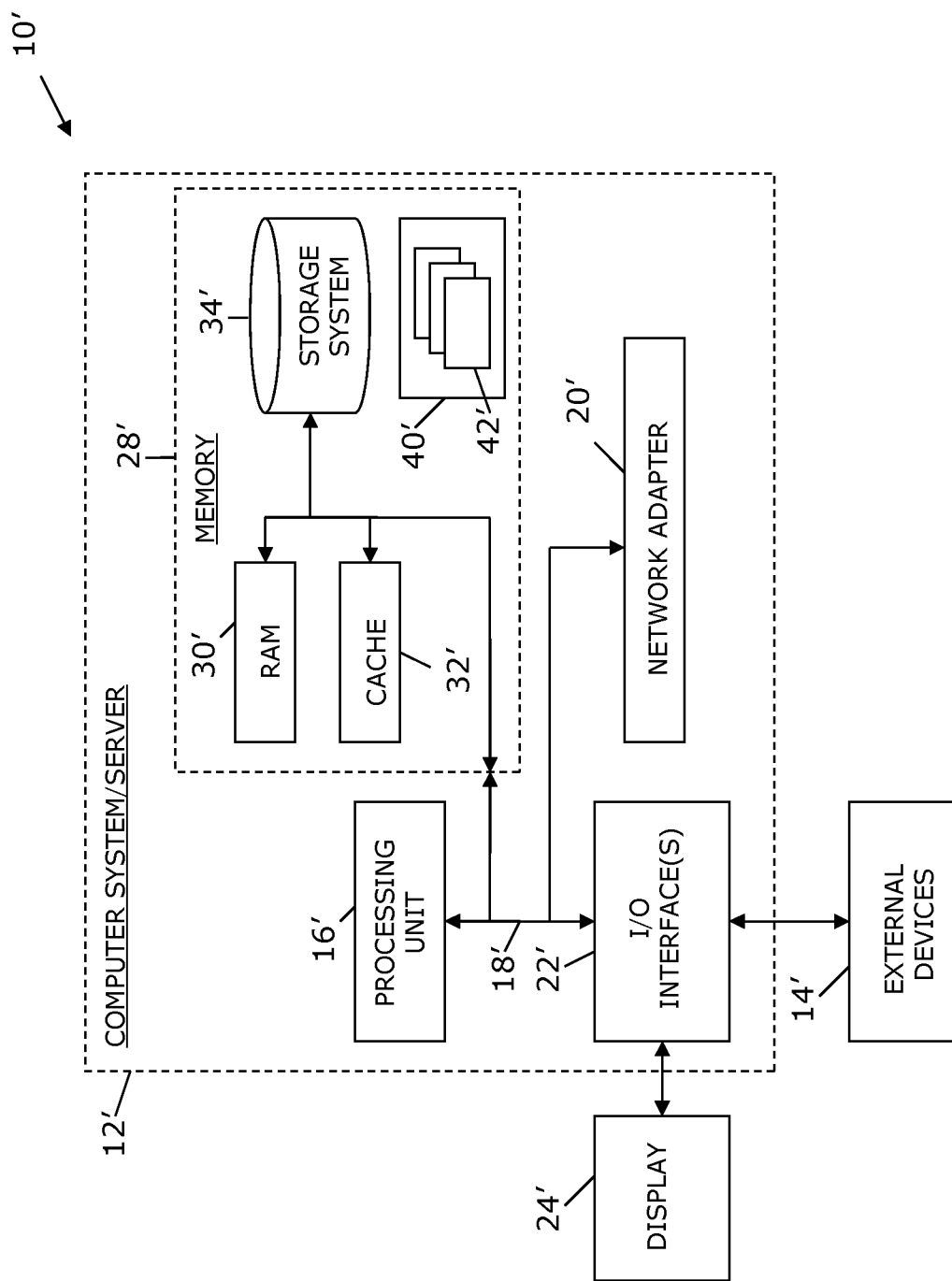
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving a plurality of loglines from a system execution log;
generating a control flow graph of the system execution log by mining (i) a plurality of templates from the system execution log and (ii) a sequence of the plurality of templates defined by an order encountered during execution from the system execution log, wherein the control flow graph identifies flows between templates during execution, wherein each template corresponds to at least one logline that reoccurs throughout the system execution log and represents an event type that (i) occurs within the system execution log and (ii) corresponds to activities occurring within a system;
mining, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that distinguish between two or more templates within the at least one control flow graph by identifying which edge at a branch in the control flow graph to traverse, thereby identifying flow from one template to another template within the control flow graph;
annotating edges of the at least one control flow graph with the values of the mined discriminative parameters within the control flow graph;
identifying execution traces from the system execution log using the values of the mined discriminative parameters; and
detecting system anomalies in the identified execution traces by comparing one of the execution traces to an expected execution identified using the annotated at least one control flow graph.

2. The method of claim 1, wherein the mining discriminative parameters comprises using a frequency distribution of the value of the parameters.

3. The method of claim 2, wherein the mining discriminative parameters comprises filtering the parameters having values occurring at a frequency under a predetermined threshold.

4. The method of claim 1, wherein the mining discriminative parameters comprises identifying templates comprising a predetermined parameter value.

5. The method of claim 4, wherein the mining discriminative parameters comprises (i) identifying flows, from the control flow graph, between the templates comprising the predetermined parameter and (ii) filtering out non-discriminative parameters.

6. The method of claim 1, wherein the mining discriminative parameters comprises comparing the frequency distribution of the value of the parameters to a probability assigned to a branching factor of a branch of the control flow graph.

7. The method of claim 6, wherein the mining discriminative parameters comprises filtering parameters having a frequency distribution that does not correlate to the probability assigned to the branching factor.

8. The method of claim 1, wherein the mining discriminative parameters comprises filtering parameters having values that flow to all children templates of a parent template.

9. The method of claim 1, wherein the mining discriminative parameters comprises building a classifier from training data generated using a given template and applying the classifier to the at least one control flow graph to extract discriminative parameters.

10. The method of claim 1, wherein the identifying execution traces comprises separating individual threads from the system execution logs using (i) discriminative parameters and (ii) the values corresponding to the discriminative parameters.

11. An apparatus, comprising:
at least one processor; and
a computer readable storage medium having computer readable program code embodied therewith and executable by the at least one processor, the computer readable program code comprising:
computer readable program code that receives a plurality of loglines from a system execution log;
computer readable program code that generates a control flow graph of the system execution log by mining (i) a plurality of templates from the system execution log and (ii) a sequence of the plurality of templates defined by an order encountered during execution from the system execution log, wherein the control flow graph identifies flows between templates during execution, wherein each template corresponds to at least one logline that reoccurs throughout the system execution log and represents an event type that (i) occurs within the system execution log and (ii) corresponds to activities occurring within a system;
computer readable program code that mines, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that distinguish between two or more templates within the at least one control flow graph by identifying which edge at a branch in the control flow graph to traverse, thereby identifying flow from one template to another template within the control flow graph;
computer readable program code that annotates edges of the at least one control flow graph with the values of the mined discriminative parameters within the control flow graph;
computer readable program code that identifies execution traces from the system execution log using the values of the mined discriminative parameters; and
computer readable program code that detects system anomalies in the identified execution traces comparing one of the execution traces to an expected execution identified using the annotated at least one control flow graph.

12. A computer program product, comprising:
a computer readable storage medium having computer readable program code embodied therewith, the computer readable program code executable by a processor and comprising:

computer readable program code that receives a plurality of loglines from a system execution log;

computer readable program code that generates a control flow graph of the system execution log by mining (i) a plurality of templates from the system execution log and (ii) a sequence of the plurality of templates defined by an order encountered during execution from the system execution log, wherein the control flow graph identifies flows between templates during execution, wherein each template corresponds to at least one logline that reoccurs throughout the system execution log and represents an event type that (i) occurs within the system execution log and (ii) corresponds to activities occurring within a system;

computer readable program code that mines, from the system execution log, (i) discriminative parameters, (ii) a position for each of the mined discriminative parameters within a template corresponding to the mined discriminative parameter, and (iii) a value of each of the mined discriminative parameters, wherein the discriminative parameters comprise parameters from the plurality of loglines that distinguish between two or more templates within the at least one control flow graph by identifying which edge at a branch in the control flow graph to traverse, thereby identifying flow from one template to another template within the control flow graph;

computer readable program code that annotates edges of the at least one control flow graph with the values of the mined discriminative parameters within the control flow graph;

computer readable program code that identifies execution traces from the system execution log using the values of the mined discriminative parameters; and computer readable program code that detects system anomalies in the identified execution traces by comparing one of the execution traces to an expected execution identified using the annotated at least one control flow graph.

13. The computer program product of claim 12, wherein the mining discriminative parameters comprises using a frequency distribution of the value of the parameters and filtering the parameters having values occurring at a frequency under a predetermined threshold.

14. The computer program product of claim 12, wherein the mining discriminative parameters comprises identifying templates comprising a predetermined parameter value.

15. The computer program product of claim 14, wherein the mining discriminative parameters comprises (i) identifying flows, from the control flow graph, between the templates comprising the predetermined parameter and (ii) filtering out non-discriminative parameters.

16. The computer program product of claim 12, wherein the mining discriminative parameters comprises comparing the frequency distribution of the value of the parameters to a probability assigned to a branching factor of a branch of the control flow graph.

17. The computer program product of claim 16, wherein the mining discriminative parameters comprises filtering parameters having a frequency distribution that does not correlate to the probability assigned to the branching factor.

18. The computer program product of claim 12, wherein the mining discriminative parameters comprises filtering parameters having values that flow to all children templates of a parent template.

19. The computer program product of claim 12, wherein the mining discriminative parameters comprises building a classifier from training data generated using a given template and applying the classifier to the at least one control flow graph to extract discriminative parameters.

20. A method, comprising:

receiving a control flow graph associated with an execution log, wherein the control flow graph comprises a plurality of templates and a plurality of edges, wherein each of the plurality of edges identifies a flow from one of the templates to another of the templates, wherein each of the plurality of templates corresponds to at least one logline that reoccurs throughout the execution log and represents an event type that (i) occurs within the execution log and (ii) corresponds to activities occurring within a system;

identifying, from the execution log, a plurality of discriminative parameters, wherein a discriminative parameter comprises a parameter that distinguishes between one of the edges from one of the templates to a second of the templates and another of the edges from the one of the templates to a third of the templates by identifying which edge at a branch in the control flow graph to traverse, thereby identifying flow from one template to another template within the control flow graph;

for each of the plurality of discriminative parameters, identifying a value of the discriminative parameter and a position of the discriminative parameter with respect to an edge of the control flow graph;

annotating, with the values of the discriminative parameter, the edge of the control flow graph corresponding to the position of the discriminative parameter; and identifying system anomalies in the execution log by comparing a system execution flow to an expected system execution flow identified using the annotated control flow graph.

* * * * *